(12) United States Patent
Englman et al.

(10) Patent No.: US 9,595,167 B2
(45) Date of Patent: *Mar. 14, 2017

(54) WAGERING GAME SYSTEM WITH PAUSING FEATURE

(71) Applicant: Bally Gaming, Inc., Las Vegas, NV (US)

(72) Inventors: Allon Englman, Chicago, IL (US); Michael G. Feeney, Elmhurst, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,371

(22) Filed: Nov. 10, 2015

(65) Prior Publication Data

US 2016/0063819 A1    Mar. 3, 2016

Related U.S. Application Data

(63) Continuation of application No. 14/587,904, filed on Dec. 31, 2014, now Pat. No. 9,208,644, which is a
(Continued)

(51) Int. Cl.
*A63F 13/00* (2014.01)
*G07F 17/32* (2006.01)
*A63F 13/40* (2014.01)

(52) U.S. Cl.
CPC .......... *G07F 17/3258* (2013.01); *A63F 13/10* (2013.01); *G07F 17/32* (2013.01); *G07F 17/3211* (2013.01); *G07F 17/3225* (2013.01)

(58) Field of Classification Search
None
See application file for complete search history.

(56) References Cited

U.S. PATENT DOCUMENTS 5,364,108 A * 11/1994 Esnouf .................... A63F 9/183
                                                            273/432
5,772,509 A    6/1998 Weiss
(Continued)

FOREIGN PATENT DOCUMENTS

AU    2004904539        8/2004
JP    2003-305175      10/2003
(Continued)

OTHER PUBLICATIONS

International Search Report corresponding to International Patent Application U.S. Appl. No. PCT/US06/022793, dated Jun. 18, 2007, 3 pages.
(Continued)

*Primary Examiner* — Sunit Pandya
(74) *Attorney, Agent, or Firm* — Nixon Peabody LLP

(57) ABSTRACT

A gaming system includes one or more controllers and one or more memory devices storing instructions that, when executed by at least one of the one or more controllers, cause the gaming system to initiate a wagering game to be played via a gaming machine and in response to a pause event, temporarily pause the wagering game-in-progress, prior to revealing a final outcome of the wagering game. While the game-in-progress is paused, the one or more controllers allow the gaming machine to participate in a community event along with a plurality of other gaming machines and in response to an end-pause event associated with the community event, reinstate the paused game-in-progress at the gaming machine.

20 Claims, 7 Drawing Sheets

Related U.S. Application Data continuation of application No. 13/798,354, filed on Mar. 13, 2013, now Pat. No. 8,926,424, which is a continuation of application No. 11/920,642, filed as application No. PCT/US2006/022793 on Jun. 9, 2006, now Pat. No. 8,439,744.

(60) Provisional application No. 60/690,770, filed on Jun. 15, 2005.

(56) References Cited

U.S. PATENT DOCUMENTS

| | | | |
|---|---|---|---|
| 5,830,063 A | 11/1998 | Byrne | |
| 6,012,982 A | 1/2000 | Piechowiak | |
| 6,270,411 B1 | 8/2001 | Gura | |
| 6,375,567 B1 * | 4/2002 | Acres | G07F 17/32 463/16 |
| 6,416,408 B2 | 7/2002 | Tracy | |
| 6,648,753 B1 | 11/2003 | Tracy | |
| 6,656,048 B2 | 12/2003 | Olsen | |
| 6,800,027 B2 | 10/2004 | Giobbi | |
| 6,817,948 B2 | 11/2004 | Pascal | |
| 7,182,690 B2 | 2/2007 | Giobbi | |
| 7,247,096 B2 | 7/2007 | Vancura | |
| 7,425,179 B2 | 9/2008 | Kazama | |
| 8,425,323 B2 * | 4/2013 | Fiden | G06Q 30/08 463/16 |
| 2002/0142827 A1 * | 10/2002 | Aida | G07F 17/3239 463/20 |
| 2003/0032479 A1 * | 2/2003 | LeMay | G07F 17/32 463/32 |
| 2003/0130026 A1 * | 7/2003 | Breckner | G07F 17/32 463/20 |
| 2003/0224852 A1 | 12/2003 | Walker | |
| 2004/0048673 A1 * | 3/2004 | Kaminkow | G07F 17/3211 463/46 |
| 2004/0152509 A1 * | 8/2004 | Hornik | G07F 17/32 463/20 |
| 2004/0204230 A1 | 10/2004 | Kazama | |
| 2004/0204235 A1 | 10/2004 | Walker | |
| 2004/0235552 A1 | 11/2004 | Gauselmann | |
| 2004/0242303 A1 | 12/2004 | Walker | |
| 2005/0014554 A1 | 1/2005 | Walker | |
| 2005/0277457 A1 | 12/2005 | Wilson | |
| 2006/0063583 A1 | 3/2006 | Thomas | |
| 2006/0258422 A1 * | 11/2006 | Walker | G07F 17/32 463/7 |
| 2008/0090650 A1 * | 4/2008 | Tarantino | A63F 3/00157 463/25 |
| 2010/0137052 A1 * | 6/2010 | Bennett | G07F 17/32 463/16 |

FOREIGN PATENT DOCUMENTS

| | | |
|---|---|---|
| JP | 2004-173956 | 12/2005 |
| WO | WO 2007/040674 A2 | 4/2007 |

OTHER PUBLICATIONS

Written Opinion corresponding to International Patent Application U.S. Appl. No. PCT/US06/022793, dated Jun. 18, 2007, 5 pages.

* cited by examiner

WAGERING GAME SYSTEM WITH PAUSING FEATURE

RELATED APPLICATIONS

This Application is a continuation of U.S. patent application Ser. No. 14/587,904, filed Dec. 31, 2014, and titled "Wagering Game System With Pausing Feature," which is a continuation of U.S. patent application Ser. No. 13/798,354, filed Mar. 13, 2013, and titled "Wagering Game System With Pausing Feature," now allowed as U.S. Pat. No. 8,926,424 on Jan. 6, 2015, which is a continuation of U.S. patent application Ser. No. 11/920,642, filed Nov. 16, 2007, and titled "Wagering Game System With Pausing Feature," now allowed as U.S. Pat. No. 8,439,744 on May 14, 2013, which is a U.S. national stage of international Application No. PCT/US/06/22793, filed Jun. 9, 2006, titled "Wagering Game System With Pausing Feature," which claims priority to U.S. Provisional Patent Application Ser. No. 60/690,770, filed Jun. 15, 2005, titled "Wagering Game System With Pausing Feature," each of which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present concepts relate generally to gaming machines and methods for playing wagering games, and more particularly, to gaming systems and methods having a pausing feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

To enhance the excitement of the bonus games, one type of wagering game provides group games in which a plurality of gaming terminals are linked together and, at some point following termination of game play on each terminal, the respective gaming terminals are introduced into the group game. A problem resulting from this approach includes delays in implementing the group game attributable to lagging game play at one or more terminals. The present invention is directed to addressing at least this problem.

SUMMARY OF THE INVENTION

The invention relates to the concept of interrupting active game play or a game-in-progress and putting such game-in-progress on hold to play a special feature such as, but not limited to, a community game. After the special feature has concluded, the game-in-progress is resumed where it was interrupted.

In one aspect of the present concepts, a gaming system comprises a gaming machine configured to play at least one casino wagering game, the gaming machine including an electronic display device and one or more electronic input devices and one or more controllers. The controller(s) is/are configured to detect, via at least one of the one or more electronic input devices, a physical item associated with a monetary value that establishes a credit balance, initiate the casino wagering game in response to an input indicative of a wager covered by the credit balance and, in response to a pause event occurring in association with the casino wagering game, temporarily pause the casino wagering game-in-progress, prior to revealing the final outcome of the casino wagering game on the electronic display device. While the casino wagering game-in-progress is paused, the controller(s) initiate a community event involving the gaming machine and at least one other gaining machine. In response to a community event end-pause event, the controller(s) reinstate the paused casino wagering game-in-progress at the gaming machine to display the final outcome of the casino wagering game on the electronic display device, and to provide any awards to the player. The controller(s) is/are also configured to receive, via at least one of the one or more electronic input devices, a cashout input that initiates a payout from the credit balance.

In another aspect of the present concepts, a method is provided for operating a gaming system, the gaming system including one or more controllers and a gaming machine, the gaining machine configured to play a casino wagering game, the gaining machine including an electronic display device and one or more electronic input devices. The method comprises the acts of detecting, via at least one of the one or more electronic input devices, a physical item associated with a monetary value that establishes a credit balance, initiating the casino wagering game in response to an input indicative of a wager covered by the credit balance, and using the one or more controllers to pause the casino wagering game-in-progress, responsive to a pause event, prior to revealing the final outcome of the casino wagering game on the electronic display device. The method also includes the acts of using the one or more controllers to initiate a community event involving the gaming machine and at least one other gaming machine while the casino wagering game-in-progress on the gaming machine is paused and using the one or more controllers to reinstate the paused casino wagering game-in-progress at the gaming machine responsive to a community event end-pause event, to display the final outcome of the casino wagering game on the electronic display device, and to provide any awards corresponding to the final outcome to the player. The method also includes the act of receiving, via at least one of the one or more electronic input devices, a cashout input that initiates a payout from the credit balance.

In still another aspect of the present concepts, a gaming machine for playing a casino wagering game comprises a gaming machine cabinet, an electronic display device coupled to the gaming machine cabinet, one or more electronic input devices coupled to the gaming machine cabinet and one or more controllers. The one or more controllers are configured to detect, via at least one of the one or more electronic input devices, a physical item associated with a monetary value that establishes a credit balance and to initiate the casino wagering game in response to an input indicative of a wager covered by the credit balance. The one or more controllers are configured, in response to a pause event occurring during the casino wagering game, to temporarily pause the casino wagering game-in-progress, prior to revealing the final outcome of the casino wagering game on the electronic display device. The one or more controllers are further configured to initiate a community event involving the gaming machine and at least one other gaming machine while the casino wagering game-in-progress is paused and, in response to a community event end-pause event, to reinstate the paused casino wagering game-in-progress at the gaming machine to display the final outcome of the casino wagering game on the electronic display device, and provide any awards corresponding to the final outcome to the player. The one or more controllers receive, via at least one of the one or more electronic input devices, a cashout input that initiates a payout from the credit balance.

Additional aspects of the invention will be apparent to those of ordinary skill in the art in view of the detailed description of various embodiments, which is made with reference to the drawings, a brief description of which is provided below.

DETAILED DESCRIPTION

Figure 1:
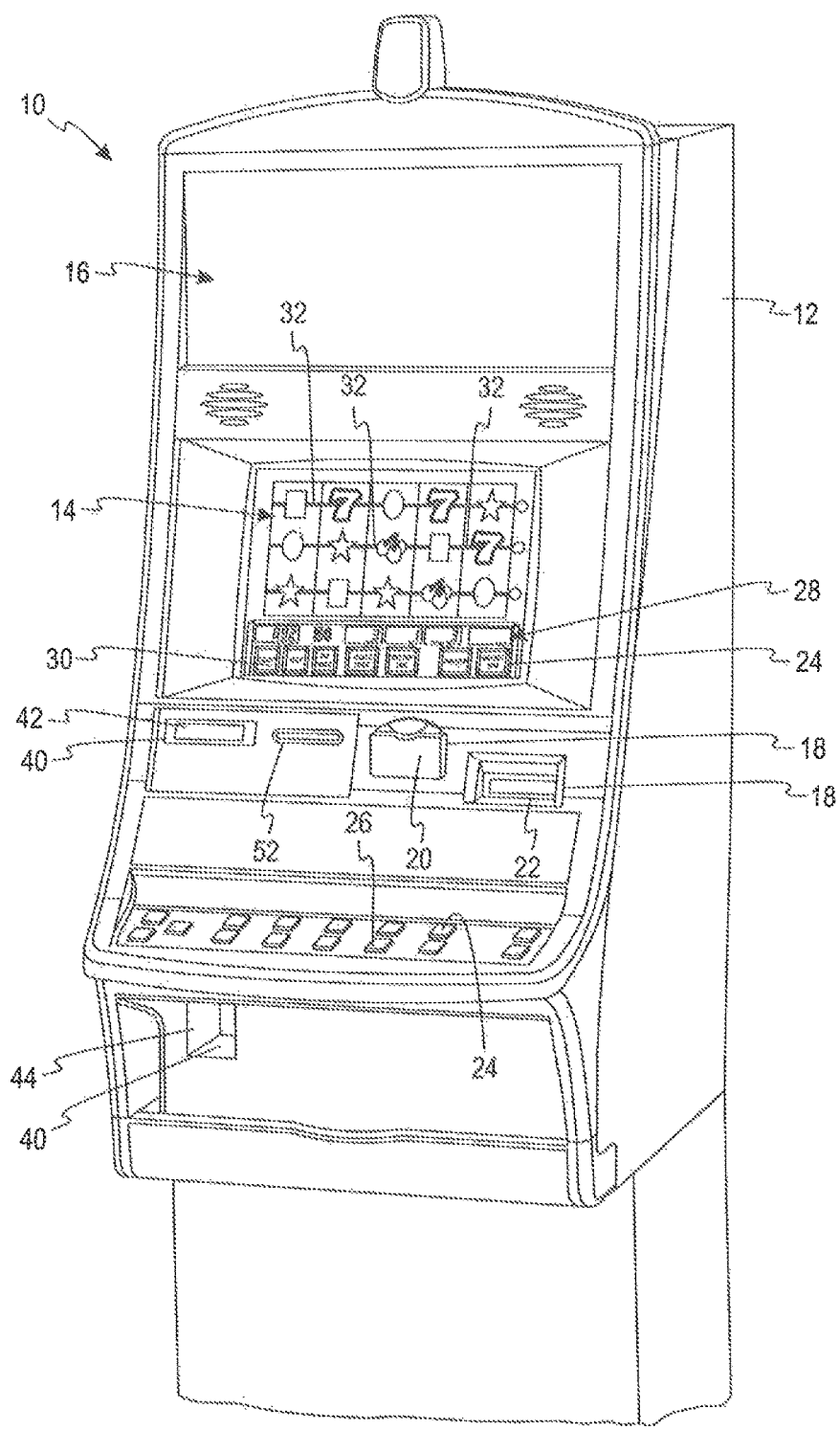
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it is to be understood that numerous other elements may exist and may be used in any combination to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 25 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, push buttons 26 may provide inputs for one aspect of the operating the game, while touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make gauge-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
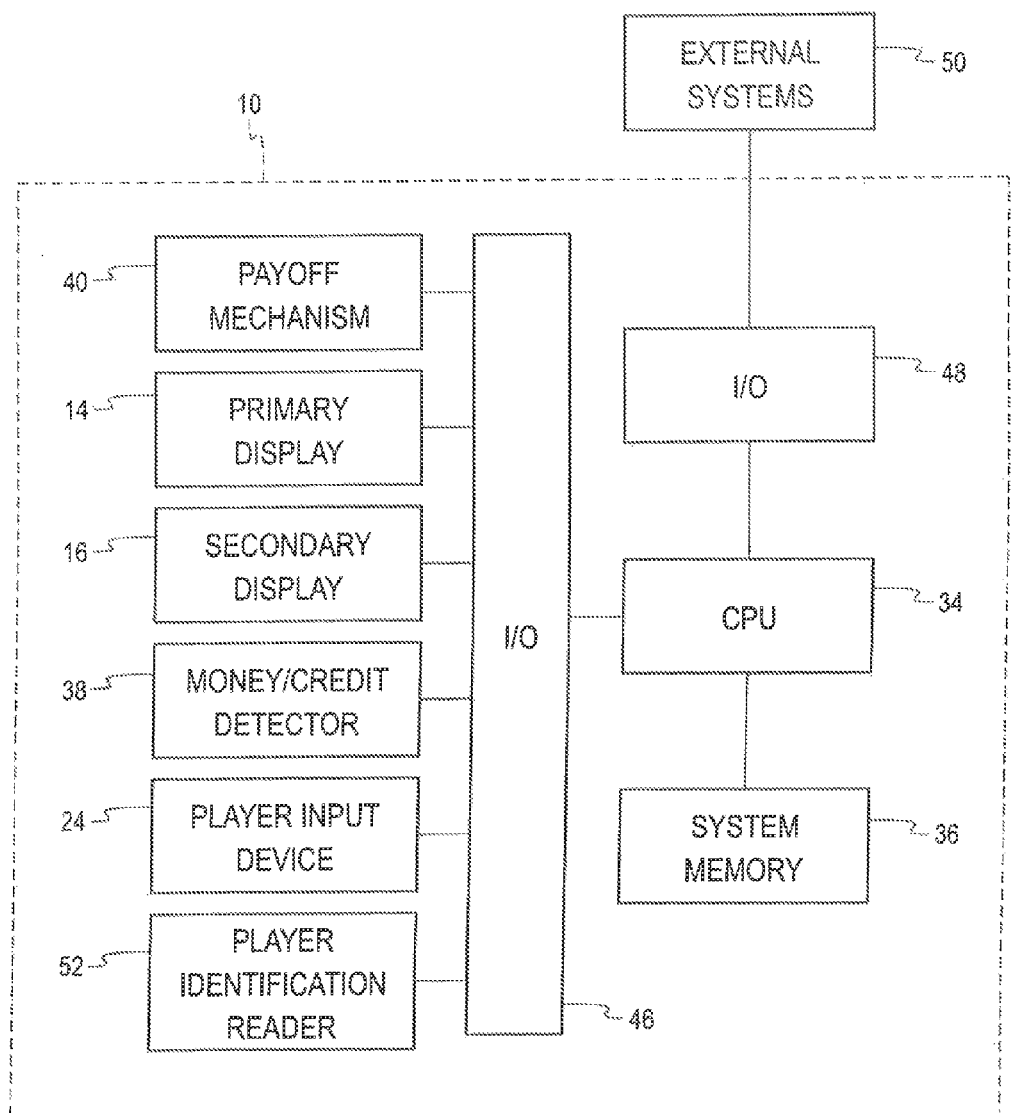
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, another controller (e.g., 65) or a variety of other interfaced systems or components. Although I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. For example, one portion of a controller 34 may control, inter alma, game-related functions for a gaming machine 10 and another portion of the same controller may control, inter alia, game-related functions for an attached gaming machine or group of gaining machines. Alternatively, control of such functions could be divided amongst two or more separate controllers (e.g., 34, 65). In FIG. 2, the controller 34 in the gaming machine 10 is depicted as comprising a CPU, but the controller 34 may alternatively comprise a CPU in combination with other components, such as the I/O circuits 46, 48 and the system memory 36.

While the gaming machine 10 of FIGS. 1 and 2 has been described with respect to a single wagering game providing a basic game and a bonus game, the gaming machine 10 may be connected, or linked, to other gaming machines for playing a community wagering game. According to one embodiment depicted in FIG. 3, a gaming system 60 of linked gaming machines 10a, 10b, 10c, 10d, 10e, 10f is shown. The gaming machines 10a-f are of the type described above in relation to FIGS. 1 and 2. The gaming machines 10a-f are each connected to a common controller 34, which may be locally or remotely disposed and which may optionally reside within one of the gaming machines. Alternatively, the aforementioned gaming machines may be connected to separate controllers 34 having communication paths established therebetween. An optional signage 62 is provided which includes a game screen 63 for displaying a game or a wagering game which, in one aspect in accord with the present concepts, is the BIG EVENT MONOPOLY™ game.

Figure 3:
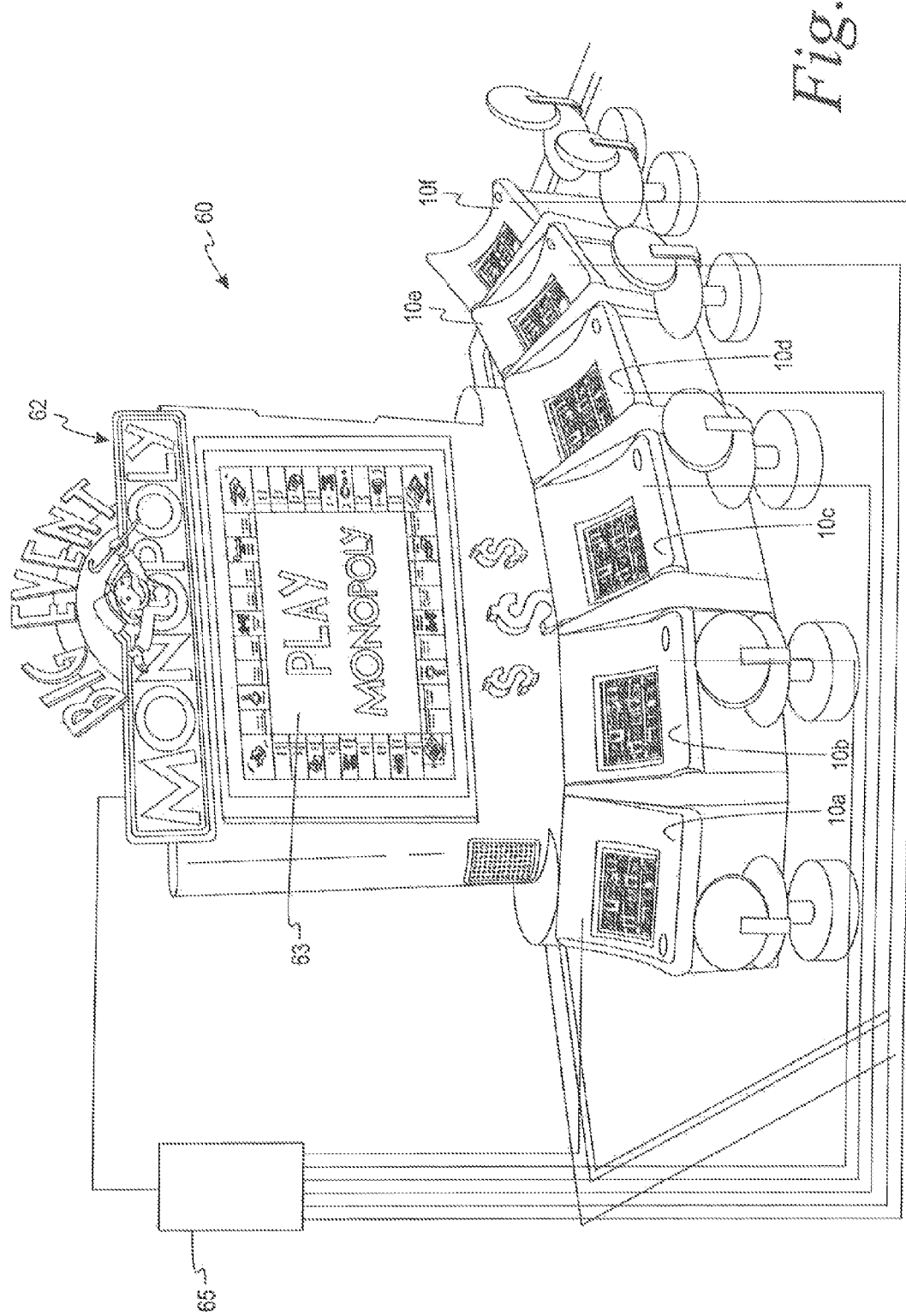
FIG. 3 is an example of a gaming system in accord with the present concepts.

As shown in FIG. 3, the game screen 63 is may be viewed by all players at the gaming machines 10a-f. In this embodiment, the gaming system 60 utilizes controller 34 and/or a separate controller 65, for controlling a special feature such as, but not limited, to a community game or the like. Alternatively, a controller 34 associated with a selected one of the gaining terminals 10a-f may be used to control a special feature for multiple gaming terminals. While six gaming machines 10a-f are shown in FIG. 3, a greater or lesser number of gaming machines can be linked together in the gaming system 60 and the gaming machines need not be adjacent or locally disposed relative to one another.

In the embodiment of FIG. 3, the signage 62 and the controller 65 form a part of the external system 50 in FIG. 2. The controller 65 is coupled to the controller 34 (FIG. 2) of each of the gaming machines 10a-f such that the controller 34 is in communication with the controller 65. In one embodiment, the controller 34 receives a special-feature-triggering signal from the controller 65. In such embodiment, the controller 65 outputs (e.g., to eligible ones of gaming machines 10a-f) such a special-feature-triggering signal in response to, for example, a special-feature outcome generated by the controller 65, a special-feature outcome achieved by one or more of the linked gaming machines 10a-f that is detected by the controller 65, or a signal corresponding to a special feature outcome that is transmitted to the controller 65 by the controller 34. In one aspect, the special-feature outcome generated by the controller 65 may comprise generation of a random state or a random number at a specified or selected frequency. In the example of a random number generator, the random numbers could be selected from a predetermined range of numbers or from a selected one or more of a plurality of such ranges of numbers. For example, the controller may, at selected intervals, randomly or sequentially hop through a plurality of random number generators having various ranges and generating random numbers at a specified frequency. Thus, the special-feature outcome may be varied to increase or decrease the frequency of the special-feature or even to dictate the frequency thereof, if desired. For example, the frequency of the special-feature outcome may be increased, in this embodiment, by increasing the frequency of the random number generation and/or by decreasing the range of random numbers selectable by the controller 65. In the aspect of a fixed-frequency event, eligibility requirements may be predicated upon other conditions such as, but not limited to, wagering history, time of entry, duration of play, level of wagering, player status, random numbers selected by controller 65 and/or random numbers selected by controller 34, to ensure player appeal.

In one aspect, the random number may be compared to another number or data generated by the controller 65 or stored on an associated memory device to determine whether a special-feature-triggering signal should be output to gaming machine controllers 34. In another aspect, the controller 65 may poll controllers 34 and/or receive information output by controllers 34 to determine whether any state of any linked gaming machines 10a-f corresponds to a random state (e.g., random number) generated by controller 65. The frequency and/or boundaries of the controller's 65 generation of a random state can thus be controlled to adjust the probability that, during any give increment of time selectable by or programmed into the controller, a gaming machine 10a-f (i.e., players) would be considered eligible for entry into a special feature.

The controller 65 then transmits a special-event-play signal to the linked gaming machines 10a-f, the signal enabling or initiating the special feature. The linking of the controller(s) 34 associated with each of the gaming machines 10a-f to the controller 65 may be selectively enabled and/or disabled in accord with satisfaction of preconditions to entry into a special feature, as determined by the controller 34. Alternatively, the linking of the controller(s) 34 associated with each of the gaming machines 10a-f to the controller 65 may be an open linkage wherein the controller 65 receives information from controller 34 and particulars of basic wagering game play on the gaming machines and independently determines eligibility of a particular gaming machine to participate in a special feature.

The special feature is displayed on the display 14 of selected gaming machines 10a-f if the controller(s) (e.g., 34, 65) determine that the particular gaming machines (e.g., 10a-d) are eligible for the special feature. Although the eligibility criteria may be uniform, the eligibility criteria may optionally be varied between the gaming machines to take into account variables such as, but not limited to, the wager placed by a player or the player's history.

In accord with the present concepts, a triggering signal may be used to activate a pause feature and pause a game-in-progress on a gaming machine (e.g., 10a-f). The game-in-progress, which is subject to the pause feature disclosed herein, may comprise a basic wagering game, a bonus game, a progressive game, a special feature, or any other wagering game or associated game played on a gaming machine, such as the aforementioned gaming machine 10 or gaming machines 10a-f. In one example, a player engaged in a basic wagering game at a gaming machine 10 may be invited to participate in a special feature initiated at a first community of gaming terminals 10a-f. The player, having elected to participate in the special feature initiated at the first community of gaming terminals 10a-f and having paused the basic wagering game in-progress, may be invited to join a special feature of a second community of gaming terminals 10g-10m while the first community's special feature is in progress. The present concepts thus provide a player with opportunities to decide, while playing a game, whether or not to take advantage of other time-limited opportunities which might arise.

A triggering signal may originate in, for example, one controller (e.g., 34) and he output to another controller (e.g., 65). In one aspect, the triggering signal may be output from the controller 65, used to regulate the special feature amongst a plurality of gaming machines 10a-f linked thereto, following satisfaction of a condition precedent to participation in the special feature by one or more of the gaming machines. The triggering signal output from controller 65 is then transmitted to the gaming machines 10a-f controllers 34 to initiate the pause feature. It is to be noted that the actual origin of the triggering signal is not necessarily relevant to the present concepts and the present concepts are not limited to triggering signals originating from any particular source. Moreover, it is to be understood that the term signal, as defined herein, includes not only the presence of a signal, but also includes the absence of or interruption of an otherwise constant, substantially constant, or intermittent signal.

Continuing with the BIG EVENT MONOPOLY™ example, noted above, players at the gaming machines 10a-f conduct individual basic wagering games and any associated gaming machine level game such as, but not limited to, a local bonus game. Such basic game play at any of the given machines is generally conducted independently of basic game play at any of the other gaining machines. Once the group bonus game or community game is triggered by a triggering signal, such as by a predetermined outcome or outcomes at one or more gaming machines 10-f or the controller 65, all eligible players at the linked gaining machines 10a-f, or subset thereof, may participate in the special feature. In one example, eligibility may be open to any person playing a wagering game at one of the gaming machines 10a-f. In another example, eligibility may be optionally preconditioned upon an eligibility requirement such as, but not limited to a player's wagering at a certain level (which may be time dependent) or achieving a certain player status.

In accord with one general embodiment, the gaming system 60 (FIG. 3) for playing a wagering game includes a gaming machine, such as the gaming machine 10 or gaming machines 10a-f generally described above, and the controller(s) (e.g., 65; FIG. 3) operatively associated therewith. The controller (e.g., 65) is configured to pause a game-in-progress on the gaming machine 10 upon the occurrence of a pause event, which may include receipt of a pause signal and/or determination by the controller that a particular pause-triggering outcome has occurred. The pause-triggering outcome could include any outcome(s), event(s), or condition(s) at a particular gaming machine 10, across a group of gaming machines 10a-f, or at the controller 65 itself. For a stand-along gaming machine 10, the pause-triggering outcome may include an outcome activating a game feature in the basic wagering game. For a group of gaming machines 10a-f or the controller 65 itself, the pause-triggering outcome may include an outcome activating another game, such as special feature. The controller (e.g., 34, 65), upon determining that the pause-triggering outcome has occurred, pauses games-in-progress on gaming machines 10a-f eligible to participate in such game.

In another example, the pause event may comprise a signal originating from an external (i.e., not game-related) source, such as a casino message service, concierge or other authorized person (e.g., a player's spouse or friends) sending a message to a particular player logged into a gaming machine. The player may also advantageously be provided the option to selectively disable or otherwise opt out of pause signals from selected external sources. In yet another example, the pause signal may be manually initiated by the player of the gaming machine through an appropriate input device 24.

Figure 4:
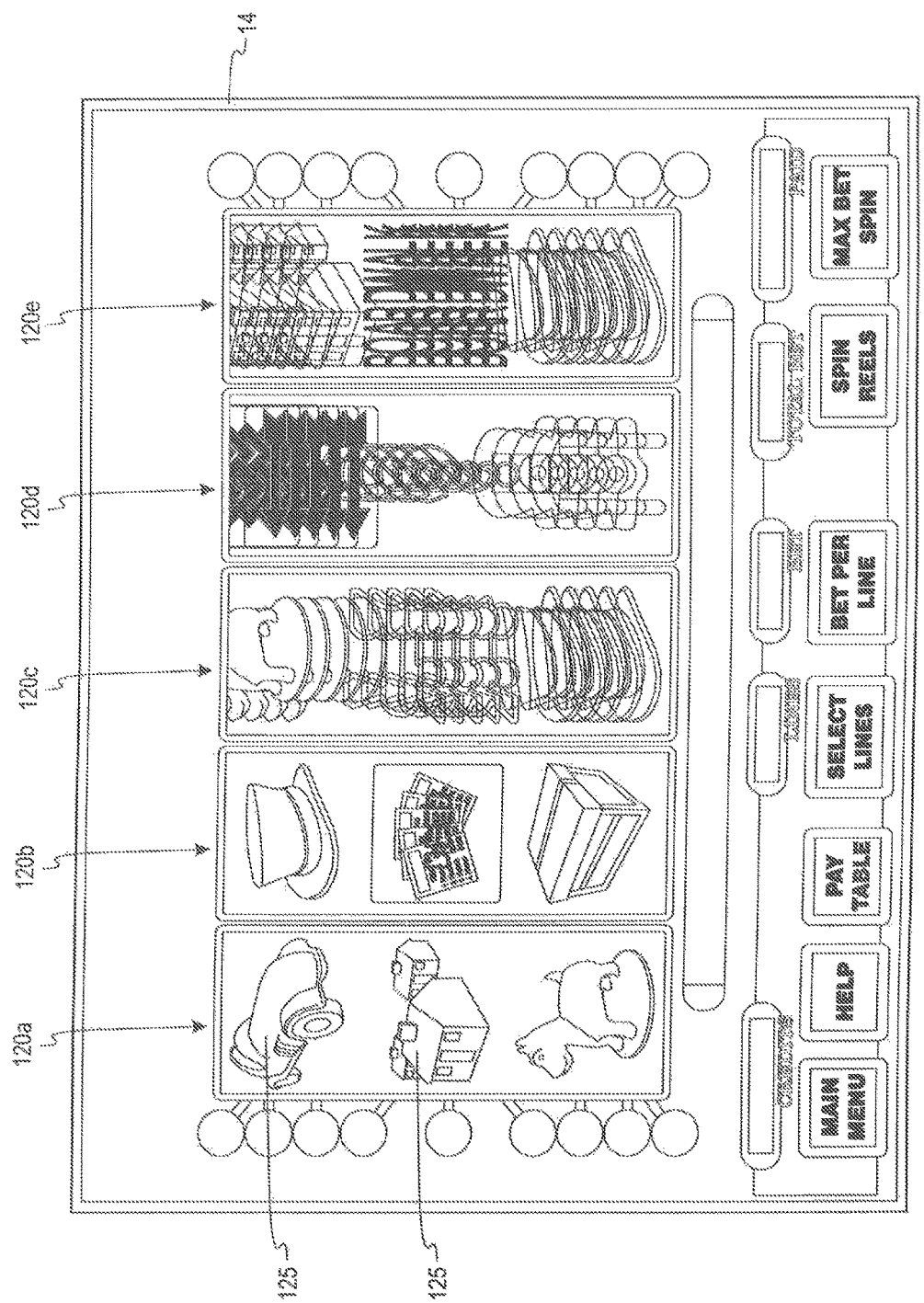
FIG. 4 is a representation of one aspect of an example of a gaming system display prior to an initiation of a pausing event in accord with the present concepts.
Figure 5:
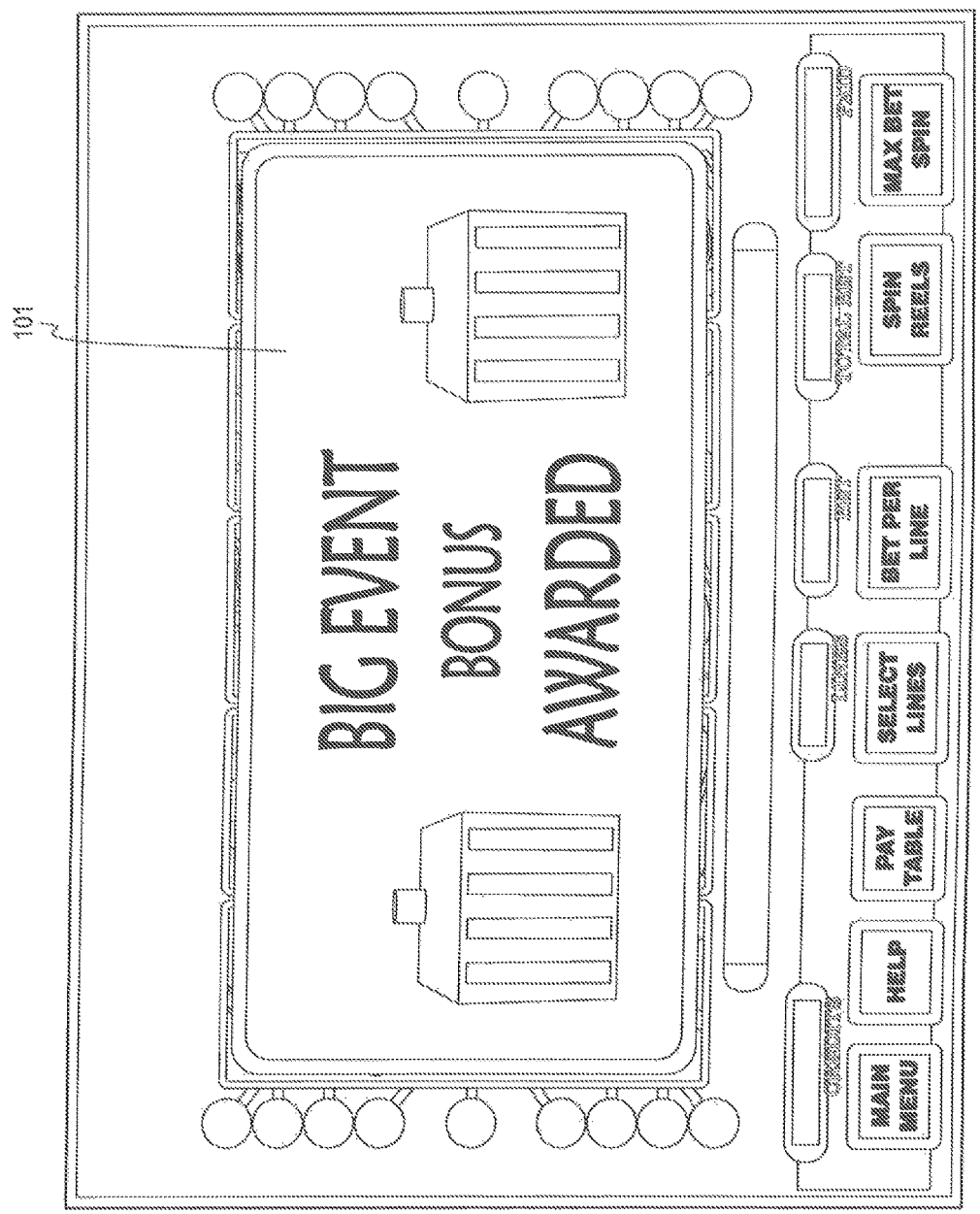
FIG. 5 is a representation of one aspect of an example of a gaming system display at an initiation of a pausing event in accord with the present concepts.

FIG. 4 shows a representation of a gaming system display 14 having a plurality of reels 120a-e bearing symbols 125 consistent with a MONOPOLY™ theme. In the instant of time represented in FIG. 4, a game is in-progress and reels 120a-b have stopped to show symbols 125 (i.e., houses and deeds, respectively) associated with a predetermined random outcome, whereas reels 120c-e remain in motion. FIG. 5 is a representation of the game-in-progress display 100 shown in FIG. 4 at an initiation of a pausing event in accord with the present concepts, discussed infra, wherein a pause screen 101 is superimposed over a portion of the game-in-progress display.

FIG. 5 shows one example of a pause screen 101 announcing "BIG EVENT BONUS AWARDED" on the main display 14 of the gaming machine 10. The pause screen 101 could generally assume any static or dynamic shape, form, or characteristic, suitable to inform the player of the gaming machine 10 that the game has just been paused. Broadly, the concept of the pause screen 101 could be extended to non-visual aspects to facilitate gaming machine 10 embodiments suitable for persons having visual impairments. In various aspects of the illustrated example, the pause screen 101 could be partially or wholly opaque, to varying degrees, to permit the entirety of or selected portions of the game-in-progress display 100 on display 14 to be visible beneath the pause screen. In another aspect, the periphery of the pause screen 101 could be sufficiently opaque to permit the periphery of the game-in-progress display 100 to be visible beneath the pause screen, while the center portion of the game-in-progress display is entirely obscured by the corresponding center portion of the pause screen.

Figure 6:
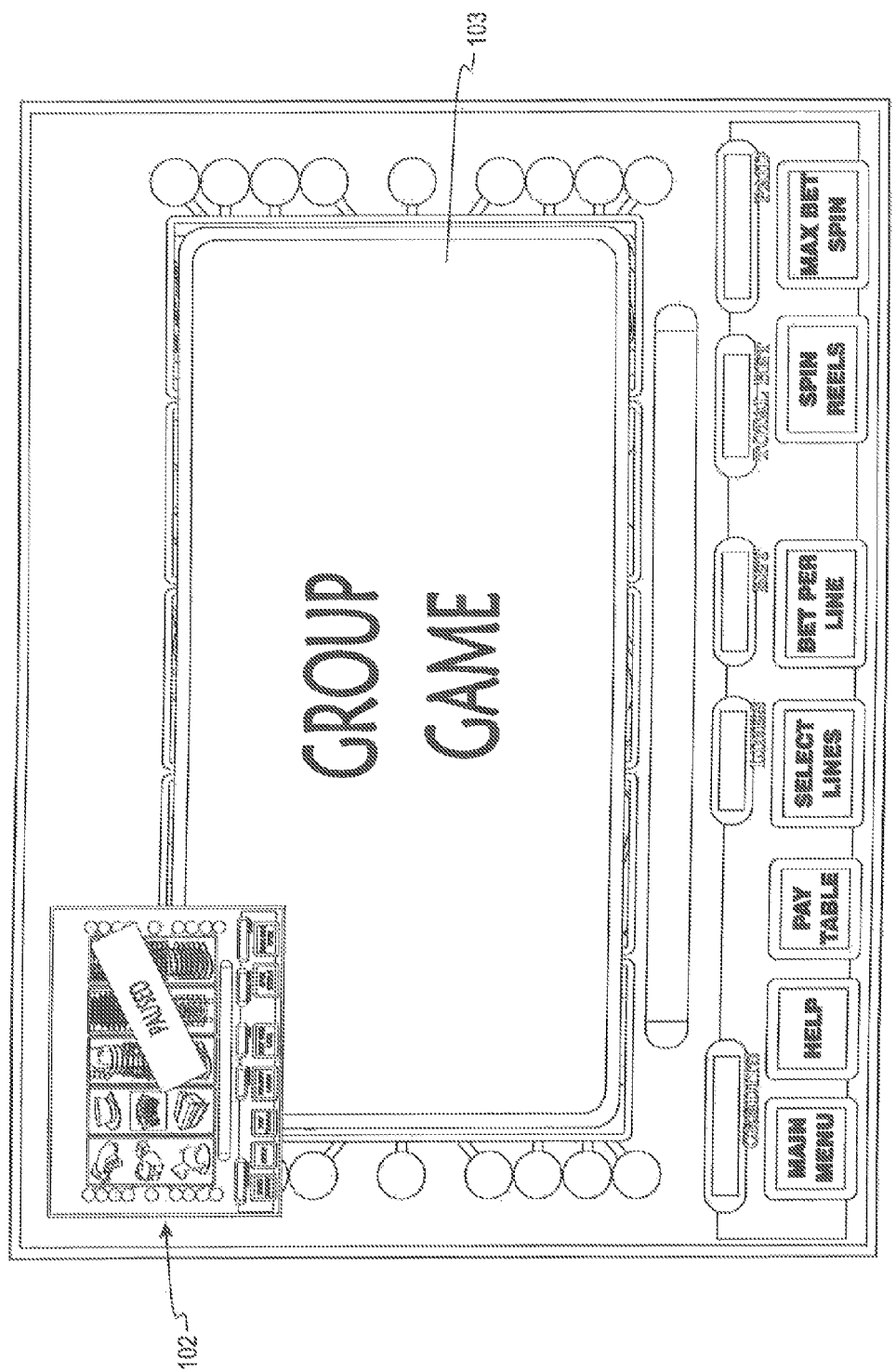
FIG. 6 is a representation of one aspect of an example of a gaming system display subsequent to initiation of a pausing event in accord with the present concepts.

In another aspect, shown in FIG. 6, a paused game-in-progress display 102 is minimized and positioned toward an outer, upper portion of the display 14. The subsequent screen(s) 103 related to the special feature or special event, or the like, may then occupy a central, prominent position on the display 14, while the minimized screen-shot of the paused game-in-progress display 102 and/or pause screen 101 provides a visual marker for the player. FIG. 6 shows a generic representation of a subsequent screen 103, titled "GROUP GAME," related to a special feature and is not intended to be limiting in any respect, but is rather showing one possible disposition of the paused game-in-progress display 102 relative to the subsequent screen 103. The subsequent screen(s) 103 may, for example, advantageously occupy the entirety of display 14 or only a portion thereof, as shown. This aspect of the present concepts thus utilizes picture-in-picture technology to maintain visual continuity between the paused game-in-progress screen 102 and subsequent screens 103 when the game-in-progress is paused.

In another aspect, the paused game-in-progress display 102 need not be directly shown and the paused game-in-progress display may be represented on the display 14 by an icon or other visual marker. For example, instead of showing the actual paused game-in-progress display 102, the logo or title of the original game or icon representing the game may be displayed at an outer periphery of the display 14 with a "GAME ON HOLD" text displayed adjacent thereto. In another aspect, the paused game-in-progress display 102 could be shown without any associated text. In other words, the paused game-in-progress display 102 could simply be depicted in minimized form or in some other form on the primary display 14 or a secondary display with the reels-in-play continuing to spin (e.g., reels 120*c-e* in FIG. 3). Although it is presently preferred to show the paused game-in-progress display 102 on the display 14, in some capacity, it is not required in accord with the present concepts and may be omitted.

In still other aspects, the pause screen 101 and/or paused game-in-progress display 102 could optionally comprise a banner and/or a message superimposed over a background graphic. In one aspect, as shown in FIG. 6, the minimized paused game-in-progress display 102 could optionally comprise a banner positioned over the minimized paused game-in-progress display, or a portion thereof, with the proclamation "GAME ON HOLD". The banner or message may be positioned, for example, across only a portion of the paused game-in-progress display, 102 such as a top, side, diagonal, or center portion thereof. The banner and/or message could likewise be static or dynamic (e.g., flashing, moving, rotating, color-changing, shape-changing, etc.) and could be positioned in any desired fixed position and angle or to move within any predetermined constraints on or relative to the game-in-progress display 100, pause screen 101, or paused game-in-progress display 102. For example, the banner, message, or other background graphic may alternatively move across or relative to the game-in-progress display 100, pause screen 101, or paused game-in-progress display 102 in accord with a predetermined or random scheme.

The pause event or pause screen 101 may also include graphics, such as a displaying an effect, icon, animation, picture or image, light(s), or sequence of light(s) to convey the occurrence of the pause event to a player of the gaming machine. Graphics may be used in conjunction with or in lieu of the aforementioned message(s) and/or banner(s) and the graphics may appear on the game-in-progress display 100 so as to precede the actual pausing of the game-in-progress or pause screen 101. In an embodiment relying exclusively on graphics to convey the message of the pause event to a player, the meaning behind the selected graphic(s) would preferably be self-evident and/or conducive to a simple explanation in the posted or available game rules. In one aspect, graphics associated with the pause function may include the appearance of a computer-generated character or animation representative of the game-in-progress on the display of the game-in-progress, whereupon the game-in-progress is paused. As one example, a Mr. Monopoly™ character could stroll onto the game-in-progress display and wave his hand to freeze the game-in-progress. The computer-generated or animated character (e.g., Mr. Monopoly™) could then motion to player to select from one of a plurality of options, such as by a wave of the hand and/or a pointing motion to one or more player-selectable buttons including options for ignoring the pause event and for responding affirmatively to the pause event. In another example, the graphics may be localized to only a portion of the display, such as a graphic or effect superimposed over or associated with the as-yet unrevealed random events of a game-in-progress (e.g., spinning video reels, face-down cards, etc.).

The pause event may also include or consist of an audio output, either alone or in accompaniment of the aforementioned graphics or messages. The pause event could thus optionally include or consist of a sound, tone or tonal sequence, audio clip, music clip, computer-generated voice, or the like, which precedes or accompanies the actual pausing of a game-in-progress. For example, the player could be instructed by a voice output over a gaming machine speaker to press or move a particular player input device 24 within a specified period of time to enter into a special feature. In another example, a distinctive sound such as a railroad whistle or the sounds of coins flowing from a jackpot, may be used to denote the need for a player to take an affirmative action within a specified period of time to enter a special event, community-game, or the like.

In accord with the above, the pause event may include any combination of graphic, audio, and/or mechanical output through an appropriate output device such as, but not limited to a display, speaker, and transducer.

The controller (e.g., 34, 65) may also be configured to reinstate a game-in progress on the gaming machine (e.g., 10, 10*a*) following the occurrence of an end-pause event, which includes an end-pause triggering outcome and/or the receipt of an end-pause signal end-pause event). In one aspect, the pause event could be a timed event and the end-pause event could simply comprise the expiration of the predetermined time period for the pause event. In other aspects, the end-pause, triggering outcome may include any event(s) outcome(s) or combinations thereof on the player's gaming machine (e.g., 10*a*) and/or another gaming machine linked together with the player's gaining machine. For example, the end-pause triggering outcome may include an event or outcome in a special feature which terminates an associated special feature game and is adapted to reinstate play of any paused games-in-progress. The end-pause signal may also comprise a player-initiated signal transmitted from a player input device 24.

Figure 7:
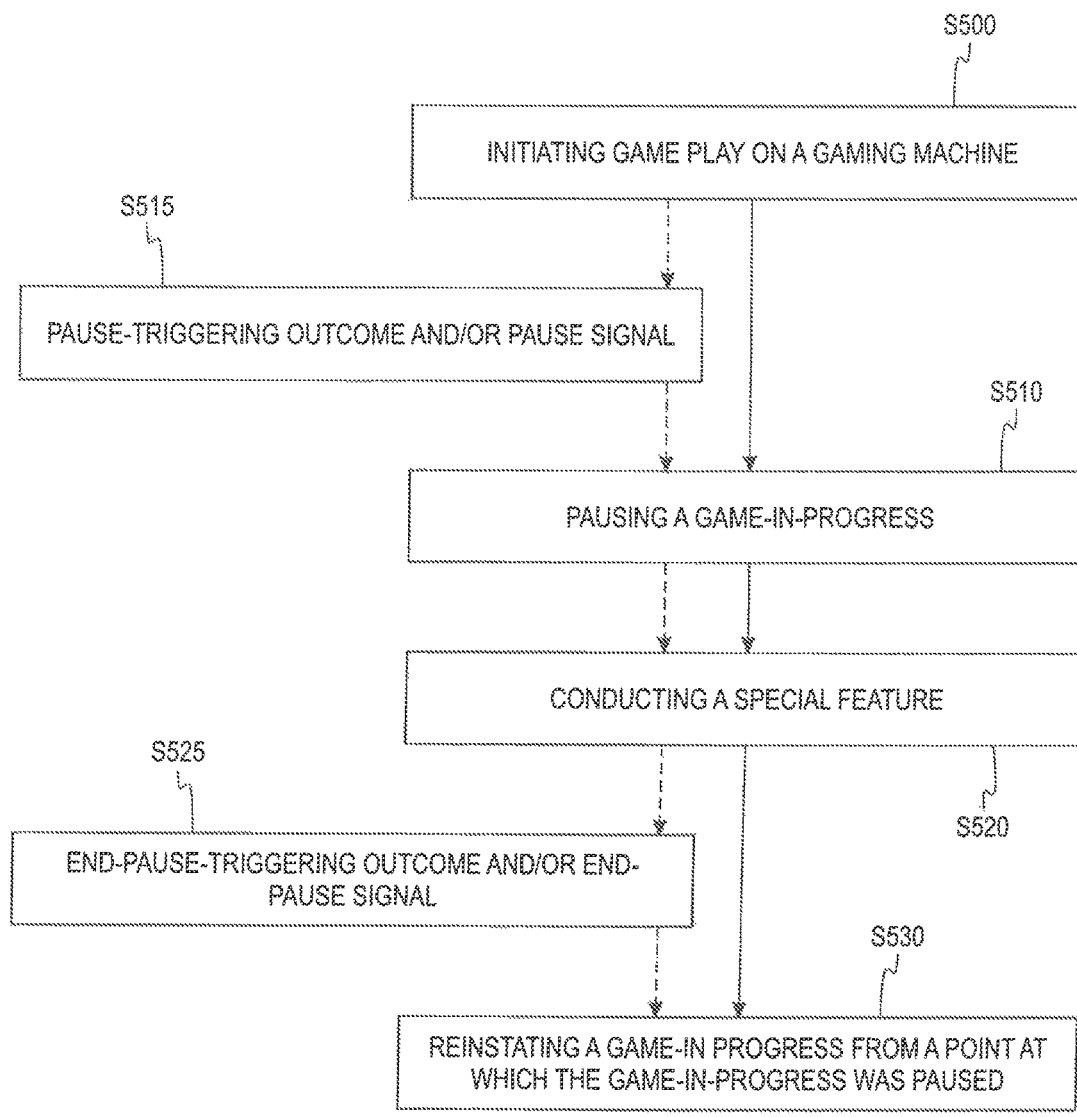
FIG. 7 depicts acts in accord with aspects of the present concepts.

As shown in FIG. 7, other aspects of the present concepts include a method of conducting a wagering game including the act of initiating game play on a gaming machine or, stated differently, conducting a first game on the gaming machine (S500). The method also includes the act of pausing a game-in-progress (e.g., pausing the first game) in act (S510). The method includes, subsequent to the act of pausing of a game-in-progress in act S510, the acts of conducting a special feature (S520) and of reinstating a game-in progress (i.e., the first game), preferably on the same gaming machine, from a point at which the game-in-progress was paused (S530).

In another method in accord with the present concepts, represented by the dashed line in FIG. 7, the act of pausing the game-in-progress (S510) follows the occurrence of a pause-triggering outcome and/or pause signal (S515). In an alternative embodiment, the act of reinstating (S520) follows the occurrence of an end-pause triggering outcome and/or end-pause signal (S525).

As noted above, the special feature may comprise a community game amongst a plurality of linked gaming terminals and the first game or game-in-progress may comprise an individual game or basic wagering game played on a gaming machine. In one aspect, the act of pausing (S510) is triggered by a controller 65 configured to control a community game or by a controller 34 in another linked gaming machine. The controllers 34, 65 may output a pause signal as part of a controller random trigger or by a game-related trigger, such as a "start community bonus" outcome at another machine within a community of machines. The trigger itself is not a requirement of the present concepts. Further, the special feature in accord with the present concepts is not limited to game-related functions, games, and/or features and broadly includes non-game related functions, games, and/or features. The special feature includes, for example, non-game related messaging sent to a player or to a gaming machine display or non-game related functions which require pausing of a game-in-progress.

The act of pausing (S510) may include, for example, any of the aforementioned graphic, audio, or mechanical outputs, or the like. The player may optionally be permitted to select, concurrent with the act of pausing (S510), an option from a plurality of selectable options concerning the act of pausing. The selectable options could include, for example, an option for continuing the game-in progress and an option for pursuing an action other than immediately continuing the game-in progress. Such other action could include, for example, entry into a special feature or selecting another paused game-in-progress for continued play.

The present concepts also include a computer readable storage medium or media encoded with instructions for directing one or more gaming machines to perform the aforementioned acts.

In accord with the above concepts, game-play flexibility is enhanced, by permitting a player to move hack and forth between one or more games-in-progress, special features, and other functions available to the player. For example, a player may be permitted to finish one bonus game and then swap back to play a paused game-in-progress while other players in a community game finish playing their game. This allows both player and wagering game operators to improve efficiency. Thus, the present concepts facilitate a multi-player environment in which bonus triggers outside of the original game can add to a player's game with minimal disruption. The present concepts further address issues regarding bonuses activated outside of the player's main game operation, such as in multi-player games with time-triggered bonuses or other player-triggered bonuses, and permit the interruption of a player's game at any point without requiring that the game be finished.

Each of these embodiments and obvious variations thereof is contemplated as falling within the spirit and scope of the claimed invention, which is set forth in the following claims. For example, the present concepts include the use of multiple player-initiated pause signals to cycle between multiple games-in-progress. This concept is similar to the practice of playing multiple BINGO cards at the same time. Further, the appended claims reflect certain aspects and combinations of the present concepts, but are not exhaustive of all such aspects and combinations. For example, the present concepts include all possible logical combinations of the claims and of the various claim elements appended hereto, without limitation, within the associated claim sets regardless of the presently indicated dependency.

What is claimed is:

1. A gaming system, comprising:
a gaming machine configured to play at least one casino wagering game, the gaming machine including an electronic display device and one or more electronic input devices; and
one or more controllers configured to:
detect, via at least one of the one or more electronic input devices, a physical item associated with a monetary value that establishes a credit balance;
initiate the casino wagering game in response to an input indicative of a wager covered by the credit balance;
in response to a pause event occurring in association with the casino wagering game, temporarily pause the casino wagering game-in-progress, prior to revealing the final outcome of the casino wagering game on the electronic display device;
while the casino wagering game-in-progress is paused, initiate a community event involving the gaming machine and at least one other gaming machine;
in response to a community event end-pause event, reinstate the paused casino wagering game-in-progress at the gaming machine to display the final outcome of the casino wagering game on the electronic display device, and to provide any awards to the player, and
receive, via at least one of the one or more electronic input devices, a cashout input that initiates a payout from the credit balance.

2. The gaming system of claim 1, wherein the one or more controllers are configured to cause the gaming system to determine eligibility of the gaming machine to participate in the community event.

3. The gaming system of claim 1, wherein the one or more controllers include an external controller linked to the gaming machine and an internal controller within the gaming machine, and wherein the external controller temporarily pauses the casino wagering game-in-progress by outputting a pause signal to the internal controller.

4. The gaming system of claim 1, wherein the one or more controllers are further configured to cause the gaming machine electronic display device to display the paused casino wagering game-in-progress in minimized form.

5. The gaming system of claim 1, wherein the one or more controllers are further configured to cause the gaming system to display graphics on the gaming machine electronic display device, indicating that the casino wagering game-in-progress is paused.

6. The gaming system of claim 1, wherein the pause event includes a random trigger in the casino wagering game or independent of the casino wagering game.

7. The gaming system of claim 1, wherein the end-pause event includes termination of the community event.

8. The gaming system of claim 1, wherein at least one of the one or more controllers are housed within the gaming machine.

9. A method for operating a gaming system, the gaming system including one or more controllers and a gaming machine, the gaming machine configured to play a casino wagering game, the gaming machine including an electronic display device and one or more electronic input devices, the method comprising the acts of:
detecting, via at least one of the one or more electronic input devices, a physical item associated with a monetary value that establishes a credit balance;
initiating the casino wagering game in response to an input indicative of a wager covered by the credit balance;
using the one or more controllers to pause the casino wagering game-in-progress, responsive to a pause event, prior to revealing the final outcome of the casino wagering game on the electronic display device;
using the one or more controllers to initiate a community event involving the gaming machine and at least one other gaming machine while the casino wagering game-in-progress on the gaming machine is paused;
using the one or more controllers to reinstate the paused casino wagering game-in-progress at the gaming machine responsive to a community event end-pause event, to display the final outcome of the casino wagering game on the electronic display device, and to provide any awards corresponding to the final outcome to the player; and receiving, via at least one of the one or more electronic input devices, a cashout input that initiates a payout from the credit balance.

10. The method for operating a gaming system according to claim 9, further comprising:
determining an eligibility of the gaming machine to participate in the community event.

11. The method for operating a gaming system according to claim 9, wherein the one or more controllers comprises a first controller interior to the gaming machine and a second controller external to the gaming machine, the second controller being communicatively linked to the gaming machine via at least one communication device, and
wherein the pausing of the casino wagering game-in-progress is performed by an output of a pause signal by the second controller to the first controller.

12. The method for operating a gaming system according to claim 9, further comprising:
displaying the paused casino wagering game-in-progress in minimized form on the electronic display device.

13. The method for operating a gaming system according to claim 9, further comprising:
displaying graphics on the electronic display device indicating that the casino wagering game-in-progress is paused.

14. The method for operating a gaming system according to claim 9, wherein the pause event includes a random trigger in the casino wagering game or independent of the casino wagering game.

15. The method for operating a gaming system according to claim 9, wherein at least one of the one or more controllers are housed within the gaming machine.

16. The method for operating a gaming system according to claim 9, wherein the community event end-pause event includes termination of the community event on the gaming machine.

17. A gaming machine for playing a casino wagering game, comprising:
a gaming machine cabinet;
an electronic display device coupled to the gaming machine cabinet;
one or more electronic input devices coupled to the gaming machine cabinet; and
one or more controllers configured to:
detect, via at least one of the one or more electronic input devices, a physical item associated with a monetary value that establishes a credit balance;
initiate the casino wagering game in response to an input indicative of a wager covered by the credit balance;
in response to a pause event occurring during the casino wagering game, temporarily pause the casino wagering game-in-progress, prior to revealing the final outcome of the casino wagering game on the electronic display device;
while the casino wagering game-in-progress is paused, initiate a community event involving the gaming machine and at least one other gaming machine;
in response to a community event end-pause event, reinstate the paused casino wagering game-in-progress at the gaming machine to display the final outcome of the casino wagering game on the electronic display device, and provide any awards corresponding to the final outcome to the player, and
receive, via at least one of the one or more electronic input devices, a cashout input that initiates a payout from the credit balance.

18. The gaming machine of claim 17, wherein the occurrence of the pause event triggers the output of a pause signal by a controller external to the gaming machine to the one or more controllers of the gaming machine, the pause signal causing the one or more controllers of the gaming machine to pause the wagering game-in-progress at the gaming machine prior to the display of the final outcome on the electronic display device.

19. The gaming machine of claim 17, wherein the pause event comprises a trigger arising from the casino wagering game conducting on the gaming machine or on another gaming machine.

20. The gaming machine of claim 17, wherein the pause event comprises a trigger arising from an event on the gaming machine or on another gaming machine.

* * * * *